(No Model.)
T. C. LOE.
ELECTRIC CABLE JOINT.
No. 516,161. Patented Mar. 6, 1894.
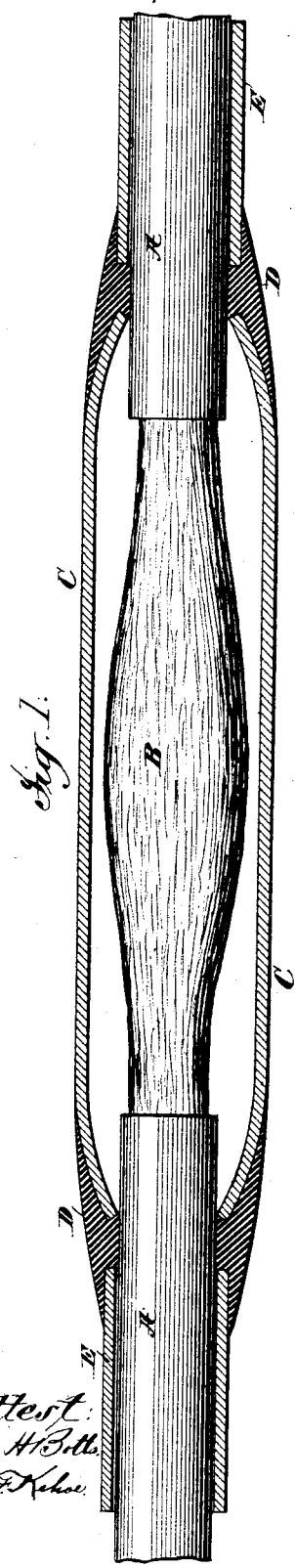
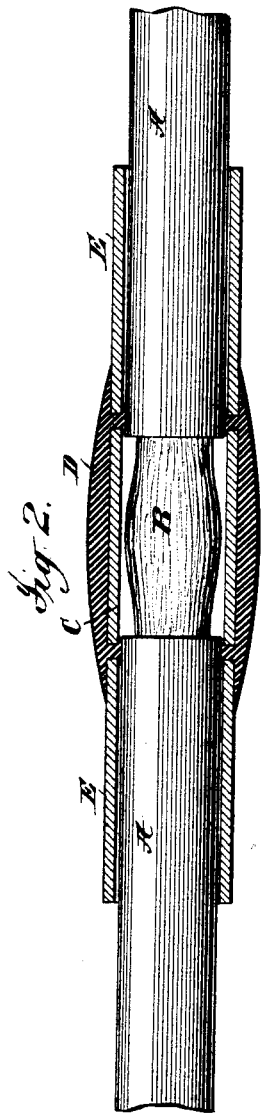
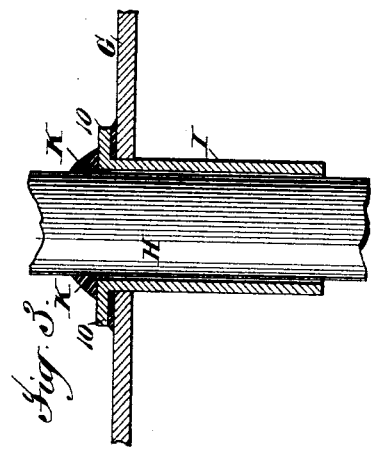

UNITED STATES PATENT OFFICE.

THOMAS C. LOE, OF NEW YORK, N. Y., ASSIGNOR TO THE STANDARD UNDERGROUND CABLE COMPANY, OF PITTSBURG, PENNSYLVANIA.

ELECTRIC-CABLE JOINT.

SPECIFICATION forming part of Letters Patent No. 516,161, dated March 6, 1894.

Application filed August 14, 1893. Serial No. 483,047. (No model.)

*To all whom it may concern:*

Be it known that I, THOMAS C. LOE, a citizen of the United States, residing at New York city, county of New York, and State of New York, have invented certain new and useful Improvements in Electric-Cable Joints, fully described and represented in the following specification and the accompanying drawings, forming a part of the same.

The object of the present invention is to provide an improved method of making joints in lead covered electric cables or similar lead covered constructions, and especially to provide a method and construction by which the liability of breakage of the cable at the joint is avoided.

While the invention is applicable in many other cases in which joints are to be formed, either by securing two pieces of cable together, or by securing a cable to another construction, such as a junction box, the invention is especially useful as applied to making splices in lead covered cables, and certain features of the invention reside particularly in a method of making such splices and the resulting construction. In making such splices it is customary to cut away the lead sheath about the end of the cables to be spliced, then connect the separate wires of the exposed ends, apply a lead sleeve over the splice thus formed so as to overlap the lead covered ends of the two cables, and complete the splice by a wipe of the solder at each end of the sleeve, securing the sleeve and lead covering of the cable together. It is found in practice that in this construction the lead covering of the cable is liable to break at the edge of the wipe, as the cable is bent in use, the breakage of the cable at this point resulting from the formation by the wipe of a sharply defined line limiting the flexure of the cable and to the weakening of the lead covering at this point by the application of the hot solder. I have discovered that this liability to breakage of the cable at the wipe may be avoided by applying about the cable a protecting sleeve of lead or similar flexible material which lies under the outer edge of the wipe and extends along the cable a short distance from the wipe. The flexure of the cable is thus gradually taken up so that there is no sharply defined flexure line and liability of the cable to break at the joint under ordinary conditions of use is avoided.

For a full understanding of the invention a detailed description of constructions embodying the same in the preferred form as applied to electric cable splices and a modification showing the invention as applied to a junction box joint will now be given in connection with the accompanying drawings forming a part of this specification in which—

Figure 1 is a longitudinal section of a completed cable splice of a common form. Fig. 2 is a similar section showing another form of splice, and Fig. 3 is a longitudinal section of a completed junction box.

In Fig. 1 A, A are the two sections of the cable to be spliced, the lead covering being cut away to expose the conductors B which are connected and covered in the usual manner. C is the lead sleeve usually employed for completing the splice, this sleeve being of larger diameter than the cable A, so as to give space for the enlargement of the group of conductors by splicing. In the usual construction the lead sleeve C is secured to the cable sections A, A by wipes of solder applied to the opposite ends of the sleeve and the cable sections, and at the outer edge of these wipes the cable is liable to break open.

In the construction shown, protecting sleeves E of lead are applied about the cable sections A, A, these sleeves having their inner ends a short distance from the ends of the sleeve C and extending outward a short distance, preferably substantially as shown. The solder wipes D are applied about the ends of the sleeves C, E and the lead covering of the cable A between these sleeves, so that the wipes secure these three parts together.

It will be seen that the splice is simple and cheap of manufacture, involving nothing additional to the common splice, except the short sleeve E, and it will be found in practice that the danger of breakage at the wipes which has heretofore been a serious difficulty in cable splicing is avoided, the flexure of the cable A being taken up by the sleeves E so that there is no sharp bending of the cable on any line and a support is given to the cable outside of the portions weakened by the solder wipes.

In Fig. 2 is shown another form of splice in which a single wipe D extends over the joint, a short sleeve or winding of lead C being first placed over the joint so as to keep the solder from the bunch of conductors. The action of the protecting sleeves E in this construction is evidently the same as in the construction shown in Fig. 1.

In Fig. 3 is shown the application of the invention to forming a water tight joint between an electric cable and junction box. In this construction G is the wall of the junction box formed of tinned iron or other material suitable for soldering, and H the cable passing through an opening in the junction box. The protecting sleeve I in the form shown, consists of a sleeve extending outside the junction box a suitable distance to secure the result desired and formed with a flange 10 which rests upon and is soldered to the inner side of the wall G of the junction box, and the wipe of solder K secures the cable to the flange 10 and completes the joint. In this construction the flexure of the cable H outside the junction box is distributed and equalized by the flexure in the sleeve I so that the tendency to breakage at the point of junction with the wall of the junction box is avoided.

It will be understood that the invention is applicable also to joints of other forms than those shown, and that many modifications may be made in such constructions embodying the invention without departing from the latter.

What I claim is—

1. The method of making a joint in electric cables and similar flexible lead covered constructions, which consists in applying about the cable a sleeve of lead or similar flexible material extending outside the joint, and applying a wipe of solder about the inner end of the sleeve and joint, substantially as described.

2. The method of making a splice in electric cables which consists in uniting the bared conductors between the ends of the two sections of the cable, applying a sleeve of lead or other suitable material over the spliced portion of the cable, applying a sleeve of lead or similar flexible material about each section of cable extending outside the joint, and applying a wipe of solder about the adjacent ends of the sleeves and the cable, substantially as described.

3. A joint in an electric cable or similar flexible lead covered construction having a projecting sleeve applied about the cable at the joint, and extending outside the joint, substantially as described.

4. A joint in an electric cable or similar flexible lead covered construction having a protecting sleeve applied about the cable and extending outside the joint, and having its inner end secured by the wipe of solder closing the joint, substantially as described.

5. A splice in an electric cable or similar flexible lead covered construction having protecting sleeves applied about the cables at the joint and extending outside the joint, substantially as described.

6. A splice in an electric cable or similar flexible lead covered construction having protecting sleeves applied about the cables and extending outside the joint and having their inner ends secured by the solder closing the joint, substantially as described.

7. The combination with the two sections of cable A and sleeve C covering the splice, of the protecting sleeves E, and a wipe or wipes of solder D applied about the cable and ends of the sleeves C, E, substantially as described.

In testimony whereof I have hereunto set my hand in the presence of two subscribing witnesses.

THOMAS C. LOE.

Witnesses:
R. C. MITCHELL,
FREDK. SCHLESINGER.